United States Patent
Luo et al.

(10) Patent No.: US 11,445,157 B2
(45) Date of Patent: *Sep. 13, 2022

(54) IMAGE PROCESSOR FORMED IN AN ARRAY OF MEMORY CELLS

(71) Applicant: Micron Technology, Inc., Boise, ID (US)

(72) Inventors: Fa-Long Luo, San Jose, CA (US); Jaime C. Cummins, Bainbridge Island, WA (US); Tamara Schmitz, Scotts Valley, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,828

(22) Filed: Jan. 15, 2021

(65) Prior Publication Data
US 2021/0144350 A1 May 13, 2021

Related U.S. Application Data

(63) Continuation of application No. 16/550,707, filed on Aug. 26, 2019, now Pat. No. 10,897,605, which is a
(Continued)

(51) Int. Cl.
*H04N 9/67* (2006.01)
*H04N 1/60* (2006.01)
(Continued)

(52) U.S. Cl.
CPC .............. *H04N 9/67* (2013.01); *G06F 17/16* (2013.01); *H04N 1/6027* (2013.01); *H04N 1/6077* (2013.01); *H04N 9/735* (2013.01)

(58) Field of Classification Search
CPC ...... H04N 9/67; H04N 1/6027; H04N 1/6077; H04N 9/735; H04N 1/60; H04N 9/69;
(Continued)

(56) References Cited

U.S. PATENT DOCUMENTS 4,380,046 A   4/1983  Fung
4,435,792 A   3/1984  Bechtolsheim
(Continued)

FOREIGN PATENT DOCUMENTS

CN  102141905  8/2011
EP    0214718  3/1987
(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing—Issues in embedded single-chip multicore architectures.

(Continued)

*Primary Examiner* — Michael Lee
(74) *Attorney, Agent, or Firm* — Brooks, Cameron & Huebsch, PLLC

(57) ABSTRACT

Apparatuses, systems, and methods related to an image processor formed in an array of memory cells are described. An image processor as described herein is configured to reduce complexity and power consumption and/or increase data access bandwidth by performing image processing in the array of memory cells relative to image processing by a host processor external to the memory array. For instance, one apparatus described herein includes sensor circuitry configured to provide an input vector, as a plurality of bits that corresponds to a plurality of color components for an image pixel, and an image processor formed in an array of memory cells. The image processor is coupled to the sensor circuitry to receive the plurality of bits of the input vector. The image processor is configured to perform a color correction operation in the array by performing matrix multiplication on the input vector and a parameter matrix to determine an output vector that is color corrected.

18 Claims, 4 Drawing Sheets

Related U.S. Application Data continuation of application No. 16/002,644, filed on Jun. 7, 2018, now Pat. No. 10,440,341.

(51) Int. Cl.
  *G06F 17/16* (2006.01)
  *H04N 9/73* (2006.01)

(58) Field of Classification Search
  CPC .. H04N 9/73; G06F 17/16; G06T 1/20; G11C 13/0004; G11C 13/0021
  USPC .......................................................... 348/659
  See application file for complete search history.

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,038,339 A | 3/2000 | Hubel et al. |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |

(56) References Cited

U.S. PATENT DOCUMENTS

| | | |
|---|---|---|
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,717,462 B1 | 5/2014 | Linzer |
| 8,817,129 B1 | 8/2014 | Linzer et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,659,605 B1 | 5/2017 | Zawodny et al. |
| 9,659,610 B1 | 5/2017 | Hush |
| 9,697,876 B1 | 7/2017 | Tiwari et al. |
| 9,761,300 B1 | 9/2017 | Willcock |
| 10,079,058 B1 * | 9/2018 | Eleftheriou .......... G11C 13/004 |
| 10,440,341 B1 * | 10/2019 | Luo ........... G06F 17/16 |
| 10,897,605 B2 * | 1/2021 | Luo ........... H04N 9/67 |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2003/0231260 A1 | 12/2003 | Pate et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0172437 A1 | 9/2004 | Ogawa et al. |
| 2004/0205289 A1 | 10/2004 | Srinivasan |
| 2004/0240251 A1 | 12/2004 | Nozawa et al. |
| 2004/0243657 A1 | 12/2004 | Goren et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2005/0146733 A1 | 7/2005 | Lohweg et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0268411 A1 * | 11/2007 | Rehm ..................... H04N 1/60 348/650 |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0103805 A1 | 4/2009 | Huang |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0157079 A1 | 6/2010 | Atanassov et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0188390 A1 | 7/2012 | Sfaradi et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0118579 A1 * | 5/2014 | Kim ..................... H04N 1/60 348/242 |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0062347 A1 | 3/2015 | Jin |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |

(56) References Cited

U.S. PATENT DOCUMENTS

| | | |
|---|---|---|
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0098208 A1 | 4/2016 | Willcock |
| 2016/0098209 A1 | 4/2016 | Leidel et al. |
| 2016/0110135 A1 | 4/2016 | Wheeler et al. |
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0225422 A1 | 8/2016 | Tiwari et al. |
| 2016/0259099 A1 | 9/2016 | Cui |
| 2016/0266873 A1 | 9/2016 | Tiwari et al. |
| 2016/0266899 A1 | 9/2016 | Tiwari |
| 2016/0267951 A1 | 9/2016 | Tiwari |
| 2016/0275658 A1 | 9/2016 | Klein et al. |
| 2016/0292080 A1 | 10/2016 | Leidel et al. |
| 2016/0306584 A1 | 10/2016 | Zawodny et al. |
| 2016/0306614 A1 | 10/2016 | Leidel et al. |
| 2016/0342889 A1 | 11/2016 | Thorson et al. |
| 2016/0350230 A1 | 12/2016 | Murphy |
| 2016/0365129 A1 | 12/2016 | Willcock |
| 2016/0371033 A1 | 12/2016 | La Fratta et al. |
| 2017/0052906 A1 | 2/2017 | Lea |
| 2017/0178701 A1 | 6/2017 | Willcock et al. |
| 2017/0192844 A1 | 7/2017 | Lea et al. |
| 2017/0228192 A1 | 8/2017 | Willcock et al. |
| 2017/0235515 A1 | 8/2017 | Lea et al. |
| 2017/0236564 A1 | 8/2017 | Zawodny et al. |
| 2017/0242902 A1 | 8/2017 | Crawford et al. |
| 2017/0243623 A1 | 8/2017 | Kirsch et al. |
| 2017/0262369 A1 | 9/2017 | Murphy |
| 2017/0263306 A1 | 9/2017 | Murphy |
| 2017/0269865 A1 | 9/2017 | Willcock et al. |
| 2017/0269903 A1 | 9/2017 | Tiwari |
| 2017/0277433 A1 | 9/2017 | Willcock |
| 2017/0277440 A1 | 9/2017 | Willcock |
| 2017/0277581 A1 | 9/2017 | Lea et al. |
| 2017/0277637 A1 | 9/2017 | Willcock et al. |
| 2017/0278559 A1 | 9/2017 | Hush |
| 2017/0278584 A1 | 9/2017 | Rosti |
| 2017/0285988 A1 | 10/2017 | Dobelstein |
| 2017/0293434 A1 | 10/2017 | Tiwari |
| 2017/0301379 A1 | 10/2017 | Hush |
| 2017/0309314 A1 | 10/2017 | Zawodny et al. |
| 2017/0329577 A1 | 11/2017 | Tiwari |
| 2017/0336989 A1 | 11/2017 | Zawodny et al. |
| 2017/0337126 A1 | 11/2017 | Zawodny et al. |
| 2017/0337953 A1 | 11/2017 | Zawodny et al. |
| 2017/0352391 A1 | 12/2017 | Hush |
| 2017/0371539 A1 | 12/2017 | Mai et al. |
| 2018/0012636 A1 | 1/2018 | Alzheimer et al. |
| 2018/0024769 A1 | 1/2018 | Howe et al. |
| 2018/0024926 A1 | 1/2018 | Penney et al. |
| 2018/0025759 A1 | 1/2018 | Penney et al. |
| 2018/0025768 A1 | 1/2018 | Hush |
| 2018/0032458 A1 | 2/2018 | Bell |
| 2018/0033478 A1 | 2/2018 | Lea et al. |
| 2018/0039484 A1 | 2/2018 | La Fratta et al. |
| 2018/0046405 A1 | 2/2018 | Hush et al. |
| 2018/0046461 A1 | 2/2018 | Tiwari |
| 2018/0060069 A1 | 3/2018 | Rosti et al. |
| 2018/0074754 A1 | 3/2018 | Crawford |
| 2018/0075899 A1 | 3/2018 | Hush |
| 2018/0088850 A1 | 3/2018 | Willcock |
| 2018/0102147 A1 | 4/2018 | Willcock et al. |
| 2018/0108397 A1 | 4/2018 | Venkata et al. |
| 2018/0130515 A1 | 5/2018 | Zawodny et al. |
| 2018/0136871 A1 | 5/2018 | Leidel |
| 2019/0066780 A1* | 2/2019 | Hu ..................... G11C 11/56 |
| 2019/0370310 A1 | 12/2019 | Graves et al. |
| 2021/0210138 A1* | 7/2021 | Lu ..................... G06F 7/5443 |
| 2021/0240945 A1* | 8/2021 | Strachan ............. G06F 15/80 |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1999 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

(56) References Cited

OTHER PUBLICATIONS

International Search Report and Written Opinion for related PCT Application No. PCT/US2019/026453, dated Jul. 30, 2019, 13 pages.

Hu Xiaofang et al: "Multilayer RTD-memristor-based cellular neural networks for color image processing", Neurocomputing, vol. 162, pp. 150-162, XP029233630, ISSN: 0925-2312, DOI: 10.1016/J.NEUCOM.2015.03.057.

Leibin Ni et al: "An energy-efficient matrix multiplication accelerator by distributed in-memory computing on binary RRAM crossbar", 2016 21 ST Asia and South Pacific Design Automation Conference (ASP-DAC), IEEE, Jan. 25, 2016 (Jan. 25, 2016), pp. 280-285, XP032877600, DOI: 10.1109/ASPDAC.2016.7428024.

Extended Search Report from related European Application No. 19814609.4, dated Feb. 7, 2022, 6 pages.

\* cited by examiner $$\begin{Bmatrix} \begin{pmatrix} b_1 \\ b_2 \\ b_3 \end{pmatrix} \end{Bmatrix} = \begin{pmatrix} w_{11} & w_{12} & w_{13} \\ w_{21} & w_{22} & w_{23} \\ w_{31} & w_{32} & w_{33} \end{pmatrix} \begin{pmatrix} a_1 \\ a_2 \\ a_3 \end{pmatrix}$$

IMAGE PROCESSOR FORMED IN AN ARRAY OF MEMORY CELLS

PRIORITY INFORMATION

This application is a Continuation of U.S. application Ser. No. 16/550,707, filed Aug. 26, 2019, which issues as U.S. Pat. No. 10,897,605 on Jan. 19, 2021, which is a Continuation of U.S. application Ser. No. 16/002,644, filed Jun. 7, 2018, which issued as U.S. Pat. No. 10,440,341 on Oct. 8, 2019, the contents of which are included herein by reference.

TECHNICAL FIELD

The present disclosure relates generally to semiconductor memory and methods, and more particularly, to apparatuses, systems, and methods for an image processor formed in an array of memory cells.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random access memory (DRAM), static random access memory (SRAM), synchronous dynamic random access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random access memory (ReRAM), ferroelectric random access memory (FeRAM), and magnetoresistive random access memory (MRAM), such as spin torque transfer random access memory (STT RAM), among other types.

DETAILED DESCRIPTION

The present disclosure includes systems, apparatuses, and methods associated with an image processor formed in an array of memory cells. In a number of embodiments, an apparatus includes sensor circuitry configured to provide an input vector, as a plurality of bits that corresponds to a plurality of color components for an image pixel, and an image processor formed in an array of memory cells. The image processor is coupled to the sensor circuitry to receive the plurality of bits of the input vector. The image processor is configured to perform a color correction operation in the array of memory cells by performance of matrix multiplication on the input vector and a parameter matrix to determine an output vector that is color corrected.

With an increasing demand for higher image resolutions, the data access bandwidth from memory (e.g., DRAM) to processing units of an image signal processor (ISP) (e.g., on a host that may be indirectly coupled to the memory) is progressively increasing. Such increases in data access bandwidth may cause power consumption for such an ISP to be unreasonably large (e.g., for mobile and/or remote devices, such as smart phones).

The present disclosure describes a number of embodiments of image processors to perform color correction processing in the array of memory cells to overcome such potential difficulties, as well as to provide other benefits. Together with there being no data feedback loop and/or related data dependence between color correction operations, various embodiments of signal processing implementations described herein for color correction may allow a majority of (e.g., all) such processing (e.g., computational units and/or control units thereof) to be moved to a memory chip (e.g., associated with and/or within a RAM array) so as to reduce the complexity of memory access.

In the architecture described herein, an image processor may be formed as a part of RAM (e.g., ReRAM) to function as a processor in memory (PIM). Such an image processor may, in a number of embodiments, be termed an in-memory color correction processor. Without resulting in degraded performance relative to other ISP implementations, this image processor may reduce power consumption for color correction without adding notably more components to the memory chip. For example, a crossbar architecture of ReRAM memory cells may not only store (e.g., be used to read and/or write) data, but also may be utilized to perform arithmetic operations such as addition, subtraction, multiplication, and/or division, in addition to the matrix multiplication described herein, on operands via a number of operations without incorporation of additional components.

Figure 2:
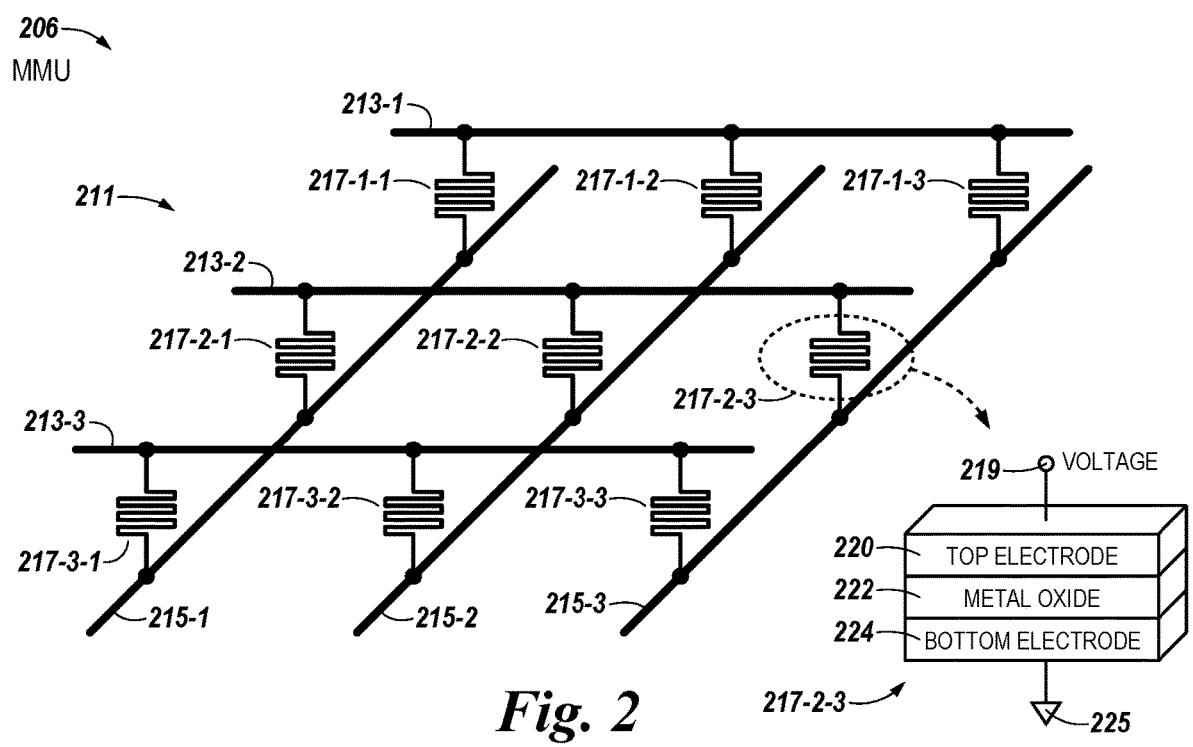
FIG. 2 is a block diagram of an example of a portion of a resistive random access memory (ReRAM) array that may be operated as an image processor in accordance with a number of embodiments of the present disclosure.

FIG. 2 of this disclosure shows a ReRAM cell and crossbar configuration for computing the color correction operations described herein. For example, a crossbar with a 3×3 ReRAM cell configuration may be used to perform matrix multiplication on a 3×3 matrix (parameter matrix)

with a 3×1 vector and then to provide an output as a 3×1 vector. As described herein, a crossbar of 3×3=9 ReRAM cells may be used as an MMU that contributes to or replaces the ISP without modification to an inherent configuration of a ReRAM crossbar array.

Consistent with the pipeline image processor configuration described in connection with FIG. 5, a plurality of crossbar arrays (e.g., a plurality of 3×3 MMUs) may be configured to perform a corresponding number of a plurality of ISP stages of color correction for a corresponding number of a plurality of pixels at the same time (e.g., during a same clock cycle). In a number of embodiments (e.g., as shown and described in connection with FIGS. 4 and 5), a number of the plurality of MMUs, the plurality of ISP stages, and the plurality of pixels each may be seven. For example, raw data (e.g., a 3×1 vector corresponding to RGB color components) of a first pixel may be input to the first crossbar to undergo a first stage of processing. A 3×1 vector may be output from the first crossbar to be input to a second crossbar to undergo a second stage of processing for the first pixel. Meanwhile, the first crossbar may perform the first stage of processing for a second pixel. Continuing with this pipeline mode, all seven processing stages for seven different pixels may be performed substantially simultaneously.

Corresponding to the image processor configuration described in connection with FIG. 6, one crossbar may be used to perform the seven processing stages for each pixel. For example, a first stage (e.g., clock cycle) may be that the raw data (e.g., RGB vector) of one pixel is input to the one crossbar to undergo the first stage of processing. The second stage of processing may be that the output (e.g., a 3×1 vector) from the first stage is input back to the same crossbar to undergo the second stage of processing for the same pixel. After seven stages, all seven processing stages for the same pixel may be completed on the one crossbar array.

Accordingly, due to the inherent signal processing capabilities of ReRAM, the color correction processing of an ISP may be performed by and/or on the memory. Moreover, through use of crossbar ReRAM architecture, for example, additional processing components for color correction may be reduced (e.g., unnecessary) because the crossbar of ReRAM may not only store data but also be utilized to perform the matrix multiplication and other arithmetic operations described herein. As such, the image processor described herein may contribute to reduction in power consumption and/or an increase in data access bandwidth related to image signal and/or color correction processing.

The figures herein follow a numbering convention in which the first digit or digits of a reference number correspond to the figure number and the remaining digits identify an element or component in the figure. Similar elements or components between different figures may be identified by the use of similar digits. For example, 104 may reference element "04" in FIG. 1, and a similar element may be referenced as 504 in FIG. 5.

Figure 1:
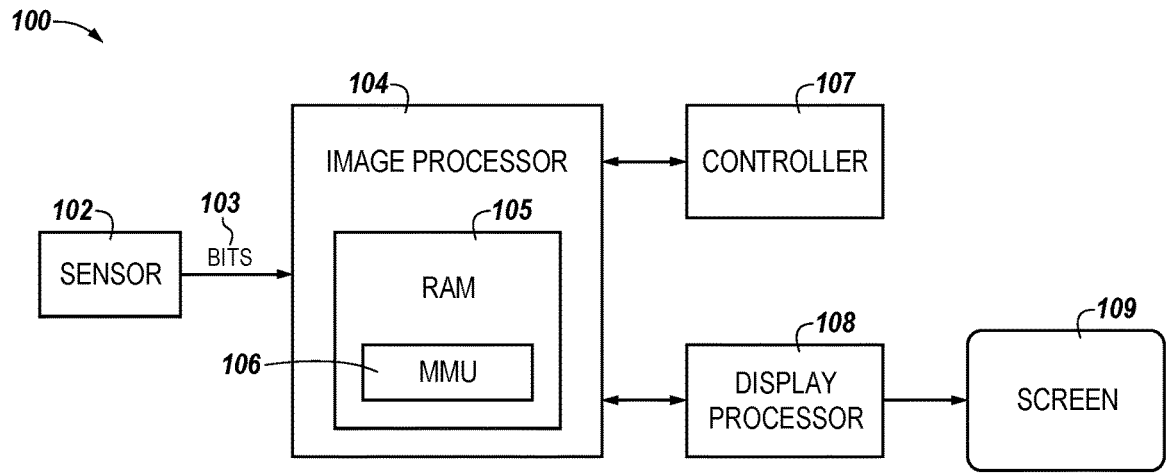
FIG. 1 is a schematic diagram illustrating an example of a resource implementation that may be utilized to include an image processor formed in an array of memory cells in accordance with a number of embodiments of the present disclosure.

FIG. 1 is a schematic diagram illustrating an example of a resource implementation that may be utilized to include an image processor formed in an array of memory cells in accordance with a number of embodiments of the present disclosure. The resource implementation 100 illustrated in FIG. 1 is intended to show components that may be particularly applicable to in-memory color correction processing and other electrical, mechanical, and/or processing elements that may contribute to such processing may be omitted for clarity.

The resource implementation 100 described herein includes sensor circuitry 102 configured to provide an input vector as a plurality of bits 103 that corresponds to a plurality of color components for an image pixel. In a number of embodiments, the sensor circuitry 102 may be, or may include, digital image sensors and/or photosensors arranged in a color filter array (e.g., a Beyer filter, among other possible configurations) for digital acquisition of a color image. The digital image sensors and/or photosensors may be configured to provide a plurality of bits 103 that corresponds to a plurality of color components for an image pixel. For example, each of the sensors may be configured to provide a data value that indicates a level of one of a plurality of color components for the image pixel.

The resource implementation 100 described herein also includes an image processor 104 formed in an array of memory cells (e.g., as shown and described in connection with FIG. 2). The image processor 104 may be coupled to (e.g., directly via a bus and without intervening processing circuitry) the sensor circuitry 102 to receive the plurality of bits 103 of the input vector corresponding to the plurality of color components for the image pixel sensed and/or acquired by the sensor circuitry 102. The image processor 104 may be configured to perform color correction operation by performing matrix multiplication on the input vector (e.g., as shown at 331 and described in connection with FIG. 3) and a parameter matrix (e.g., as shown at 333 and described in connection with FIG. 3) to determine an output vector that is color corrected (e.g., as shown at 334 and described in connection with FIG. 3 and elsewhere herein).

The array of memory cells, including the image processor 104, may be formed to include at least a portion of a RAM array 105. The image processor 104 may be formed in the RAM array 105 to include an MMU 106. The MMU 106 may be formed in the array as a number of memory cells (e.g., as shown and described in connection with FIG. 2) formed as an MMU 106. The number of memory cells may, in a number of embodiments, correspond to a number of parameter entries in the parameter matrix, as described herein. The memory cells included in the image processor 104 and/or MMU 106 may be configured to perform (e.g., by matrix multiplication) the determination of the color corrected output vector. The determination of the color corrected output vector may, in a number of embodiments, be performed in-memory (e.g., in the array) without the memory cells being coupled to sensing circuitry including a sense amplifier (not shown).

The number of memory cells of the MMU 106 may be formed to correspond to a number of parameter entries in a parameter matrix (e.g., as shown at 333 and described in connection with FIG. 3). The plurality of color components for the image pixel may, in a number of embodiments, correspond to three color components. The three color components may, for example, be red (R), green (G), and blue (B), among other possible numbers and/or colors for the color components of the image pixels (e.g., cyan (C), magenta (M), and yellow (Y), etc.). The plurality of bits 103 of the input vector (e.g., as shown at 331 and described in connection with FIG. 3) may be three bits to correspond to the three color components. The image processor 104 may be configured to perform the matrix multiplication on the input vector and the parameter matrix to yield an output vector (e.g., as shown at 334 and described in connection with FIG. 3) to, in a number of embodiments, include three color corrected bits. In a number of embodiments, a fast Fourier transform (FFT) may be performed for the matrix multiplication.

The resource implementation 100 described herein also may include a controller 107 configured to direct input of the input vector from the sensor circuitry 102 (e.g., directly) to the image processor 104 and/or MMU 106. The controller 107 also may be configured to direct performance of a number of color correction operations (e.g., as described in connection with FIG. 4) in the array by the image processor 104 to determine the color corrected output vector.

The resource implementation 100 described herein also may include a display processor 108. The display processor 108 may be configured to perform other ISP operations following performance of the color correction operations by the image processor 104 to yield output vectors as described herein. Output from the display processor 108 may, in a number of embodiments, be an image and/or a series of images displayable by a screen 109 (e.g., a user interface).

The image processor 104 and/or MMU 106 may, in a number of embodiments, be implemented on a number of memory resources. A "memory resource" as used herein is a general term intended to at least include memory (e.g., memory cells) arranged, for example, in a number of bank groups, banks, bank sections, subarrays, and/or rows of a number of memory devices. The memory resource may be, or may include, in a number of embodiments, a number of volatile memory devices formed and/or operable as RAM, DRAM, SRAM, SDRAM, and/or TRAM, among other types of volatile memory devices. Alternatively or in addition, the memory resource may be, or may include, in a number of embodiments, a number of non-volatile memory devices formed and/or operable as NAND, NOR, PCRAM, ReRAM, FeRAM, MRAM, and/or STT RAM, among other types of non-volatile memory devices.

FIG. 2 is a block diagram of an example of a portion of a ReRAM array that may be operated as an image processor 104 and/or MMU 106 in accordance with a number of embodiments of the present disclosure. The image processors (e.g., as shown at 104, 504-1, and 604-2 and described in connection with FIGS. 1, 5, and 6, respectively) may, in a number of embodiments, be formed in and/or as an array of memory cells (e.g., the RAM array shown at 105 and described in connection with FIG. 1). The portion of the ReRAM array illustrated in FIG. 2 may correspond to an embodiment of a single MMU 206, although embodiments of image processors 104 described herein are not limited to a single MMU, an MMU being formed as a ReRAM array, and/or the number of ReRAM memory cells shown in FIG. 2. Moreover, architecture of the array of memory cells utilized for the single MMU 206 shown in FIG. 2 may correspond to architecture of a remainder of the RAM array 105 not utilized as a number of MMUs 206 (e.g., the remainder may be utilized for other data storage and/or processing operations), although the embodiments are not so limited.

As shown in FIG. 2, the array of memory cells of the single MMU 206 may, in a number of embodiments, be formed as a 3×3 array of ReRAM cells in a crossbar configuration 211. As such, each ReRAM memory cell 217 may be coupled to and/or be formed between a first conductive line 213 and a second conductive line 215. Each of the first conductive lines 213 may correspond to a wordline and each of the second conductive lines 215 may correspond to a bitline, or vice versa, in a number of embodiments. For example, in the embodiment of the 3×3 crossbar array 211 shown in FIG. 2, the MMU 206 includes ReRAM cells 217-1-1, 217-1-2, and 217-1-3 coupled to conductive line 213-1, ReRAM cells 217-2-1, 217-2-2, and 217-2-3 coupled to conductive line 213-2, and ReRAM cells 217-3-1, 217-3-2, and 217-3-3 coupled to conductive line 213-3. Resulting from the configuration of the 3×3 crossbar array 211, ReRAM cells 217-1-1, 217-2-1, and 217-3-1 are coupled to conductive line 215-1, ReRAM cells 217-1-2, 217-2-2, and 217-3-2 are coupled to conductive line 213-2, and ReRAM cells 217-1-3, 217-2-3, and 217-3-3 are coupled to conductive line 215-3.

An example memory cell included in the crossbar array 211 configuration of ReRAM cells for the single MMU 206 is shown at 217-2-3 in the array and in more detail next to the array. The detail of the ReRAM cell 217-2-3 shows that, in a number of embodiments, a ReRAM cell may have an architecture including a top electrode 220 (e.g., which may be the same as or in addition to conductive line 213-2) coupled to a source component (not shown) for application of a particular voltage potential 219. The ReRAM cell 217-2-3 may have an architecture that includes a dielectric metal oxide 222 to serve as a switching medium (e.g., material) through which a conductive path may be formed via application of the particular voltage potential 219. The ReRAM cell 217-2-3 architecture may include a bottom electrode 224 (e.g., which may be the same as or in addition to conductive line 215-3) coupled to a ground component 225 to serve as a drain. The resistive switching mechanism of the dielectric metal oxide 222 may be based upon, for example, formation of a filament in the switching medium when the particular voltage potential 219 is applied between the top electrode 220 and the bottom electrode 224. There may be different mechanisms for implementing ReRAM based upon different switching materials and/or memory cell configurations.

Crossbar ReRAM technology may utilize a silicon-based switching material as a medium for metallic filament formation. When the particular voltage potential 219 is applied between the two electrodes 220 and 224, a nanofilament may be formed. Because the resistive switching mechanism may be based upon an electric field, a memory state (e.g., data value) of a crossbar ReRAM cell may be stable (e.g., capable of withstanding temperature swings from −40 to +125 degrees Celsius, at least a million write/read/erase cycles, and/or to provide a data retention of 10 years at +85 degrees Celsius).

Crossbar ReRAM technology may be formed in a two dimensional (2D) architecture (e.g., as shown in FIG. 2) and/or in a 3D architecture. The 2D architecture may be formed on and/or the 3D architecture may be stacked upon a single chip (e.g., die) to provide terabytes of data storage. The complementary metal oxide semiconductor (CMOS) compatibility of the crossbar ReRAM technology may enable both logic (e.g., data processing) and memory (e.g., storage) to be integrated onto the single chip. A crossbar ReRAM array may be formed in a one transistor/one capacitor (1T1C) configuration and/or in a configuration with one transistor driving n resistive memory cells (1TNR), among other possible configurations.

Multiple inorganic and organic material systems may enable thermal and/or ionic resistive switching. Such systems may be utilized in the in-memory image processors described herein. Such systems may, in a number of embodiments, include: phase change chalcogenides (e.g., $Ge_2Sb_2Te_5$, AgInSbTe, among others); binary transition metal oxides (e.g., NiO, $TiO_2$, among others); perovskites (e.g., $Sr(Zr)TiO_3$, PCMO, among others); solid state electrolytes (e.g., GeS, GeSe, $SiO_x$, $Cu_2S$, among others); organic charge transfer complexes (e.g., Cu tetracyanoquinodimethane (TCNQ), among others); organic charge acceptor systems (e.g., Al amino-dicyanoimidazole (AIDCN), among others); and/or 2D (layered) insulating materials (e.g., hexagonal BN, among others); among other possible systems for resistive switching.

Figures 3, 4:
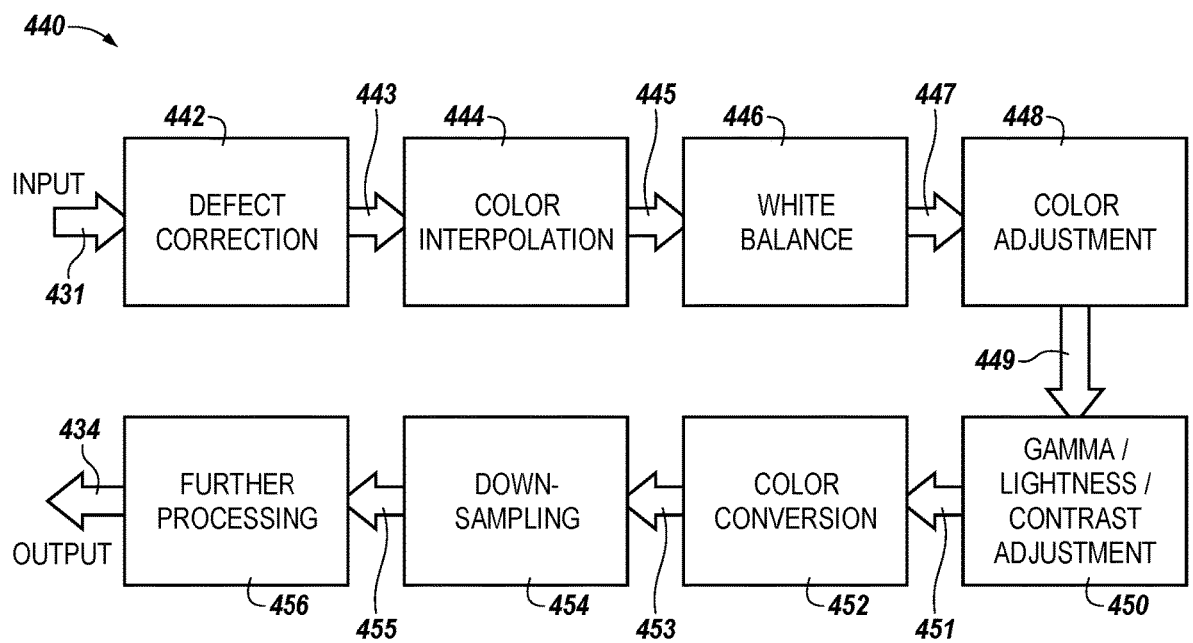
FIG. 3 illustrates an example of a parameter matrix usable by an image processor formed in an array of memory cells in accordance with a number of embodiments of the present disclosure.
FIG. 4 is a block diagram illustrating an example of a plurality of color correction operations that may be performed by a number of matrix multiplication units (MMUs) of an image processor formed in an array of memory cells in accordance with a number of embodiments of the present disclosure.

FIG. 3 illustrates an example 330 of a parameter matrix 333 used by an image processor 104 and/or MMU 106 formed in an array of memory cells in accordance with a number of embodiments of the present disclosure. As described in connection with FIG. 2, the single MMU 206 may be formed in the RAM array 105 of memory cells as a 3×3 array of resistive ReRAM cells 217 in a crossbar 211 configuration.

Each MMU of a plurality of MMUs for use in a pipeline (e.g., as shown and described in connection with FIG. 5) and/or a single MMU to be repeatedly used (e.g., as shown and described in connection with FIG. 6) may include (e.g., store) one parameter matrix 333 at a time. The one parameter matrix 333 may be selected and/or input from a plurality of selectable parameter matrices. Examples of the plurality of different parameter matrices that enable performance of a corresponding number of a plurality of different color correction operations on MMUs 206 of the image processor 104 are described in connection with FIG. 4. The plurality of selectable parameter matrices to enable the plurality of different color correction operations may be stored by a parameter matrix component (e.g., as shown at 672 and described in connection with FIG. 6). One of the plurality of selectable parameter matrices may, in a number of embodiments, be selectable by a control unit (e.g., as shown at 671 and described in connection with FIG. 6) for input to the single MMU 106. The one parameter matrix 333 may include nine (3×3) parameter entries to be stored on the corresponding array of nine (3×3) ReRAM memory cells 217 of the MMU 206.

Such a parameter matrix 333 may be represented by:

$$\begin{pmatrix} w_{11} & w_{12} & w_{13} \\ w_{21} & w_{22} & w_{23} \\ w_{31} & w_{32} & w_{33} \end{pmatrix}$$

where each w value may represent a color correction coefficient to be stored at the position of a corresponding ReRAM memory cell 217, as indicated by the subscripts of coefficients $w_{xx}$. Each of the plurality of input vectors 331 utilized in performance of the matrix multiplication with the parameter matrix 333 may be a 3×1 vector 332. In a number of embodiments, the 3×1 vector 332 may have three values ($a_1$, $a_2$, $a_3$) that correspond to the levels sensed by the sensor circuitry 102 for each of the color components (e.g., RGB, CMY, etc.) of a pixel. The output vectors 334 determined by matrix multiplication of each of the input vectors 331 by a particular parameter matrix 333 also may each be a 3×1 vector 336 having three values ($b_1$, $b_2$, $b_3$) that correspond to color corrected levels of the color components (e.g., RGB, CMY, YUV, etc.) of the pixel.

Accordingly, a number of parameter entries in a particular parameter matrix 333 is a number of the plurality of bits in an input vector 331 squared (e.g., 3×3=9 parameter entries). A particular parameter entry of the parameter matrix may be stored by a corresponding memory cell 217 in the MMU 206 of the image processor 104 and a number of a plurality of memory cells in the MMU 206 may be based at least in part on the number of the plurality of bits in the input vector (e.g., nine ReRAM memory cells 217 in the MMU 206 shown and described in connection with FIG. 2). The number (e.g., nine) of the plurality of memory cells in the MMU may be arranged in a substantially rectilinear configuration. For example, an edge of each of the two rectilinear directions of the MMU 206 may be formed to include the number of the plurality of memory cells 217 corresponding to the number of the plurality of bits of the input vector 331 (e.g., three memory cells 217 corresponding to three bits of the 3×1 vector 332).

A number of alternative color spaces may be used. Such alternative color spaces may, in a number of embodiments, utilize more than three color components per pixel (e.g., a four color CMYK color space in which black (K) is added to CMY, although embodiments are not so limited). Accordingly, the number of parameter entries in a particular parameter matrix 333 may be a number of the color components per pixel squared, which may correspond to the plurality of bits in the input vector 331 (e.g., 4×4=16 parameter entries). The number of parameter entries in the parameter matrix may, in a number of embodiments, be based on a different number of bits on each side of the matrix (e.g., 4×3=12 parameter bits). A controller (e.g., as shown at 107) may be configured to include a variable number of the plurality of memory cells 217 to correspond to the number of the plurality of bits of the input vector 331 (e.g., based upon the number of color components, the number of bits per pixel, and/or the number of parameter entries in the parameter matrix).

FIG. 4 is a block diagram illustrating an example of a plurality of color correction operations 440 that may be performed by a number of MMUs 206 of an image processor 104 formed in an array of memory cells in accordance with a number of embodiments of the present disclosure.

An ISP may be an important component of, for example, a digital camera and may be used in various applications (e.g., smart phones, security surveillance systems, and automated (self-driving) vehicles, among many other applications). As described herein, an image processor 104 may perform in-memory at least some of the operations that an ISP may perform. For example, the following seven signal processing operations for color correction may be performed in-memory by the image processor 104: defect correction; demosaic (color interpolation); white balance; color adjustment; gamma adjustment for lightness and/or contrast enhancement; color conversion; and/or down-sampling. These operations may be performed in sequence, although the order between some operations (e.g. color interpolation and white balance) may be reversed. Seven operations of such a sequence of color correction operations are presented herein by way of example. However, such sequences each may, in a number of embodiments, include fewer than or more than seven color correction operations to be performed by the image processor 104.

As described herein, a plurality of bits 103 for an input vector 431 may be input to a particular MMU 206 that stores a particular parameter matrix 333 to enable matrix multiplication for performance of a particular color correction operation 440 by the image processor 104. The input vector 431 may be input (e.g., directly) from the sensor circuitry 102 to a particular MMU 206 for performance of a first operation in the sequence of color correction operations 440. The input vectors 431 input to the particular (e.g., first) MMU 206 may be raw data (e.g., in the form of bits 103) that conform to a color pattern. An example of such a color pattern is the Bayer pattern where half of the total number of pixels are G, while a quarter of the total number of pixels is assigned to both R and B. The Bayer pattern of a color image sensor 102 (e.g., the respective digital image sensors and/or photosensors arranged in a color filter array) may be covered with either a R, a G, or a B filter in a repeating 2×2 patter arrangement.

The sequence of the plurality of color correction operations described herein may be performed by one or more MMUs 206 of the image processor 104. The crossbar array 211 of memory cells, including the MMUs 206 of the image processor 104, is formed as ReRAM having memory cells 217 configured to store data values and to perform the color correction operation thereon in-memory without feedback from a subsequent in-memory color correction operation performed in the sequence. For example, an output vector 334 resulting from performance of one color correction operation may be input as an input vector 331 for performance of a next color correction operation in the sequence, but not as input for a previous color correction operation in the sequence.

A first color correction operation performed in the sequence by the image processor 104 and/or MMU 206 may be a defect correction operation, as shown at 442 in FIG. 4, for a pixel having a color value different from neighboring pixels. For example, when an image sensor of the sensor circuitry 102 senses a pixel having a color value that is notably different from its neighbors, the different pixel may be distracting and/or unacceptable to a viewer. Such pixels may be termed "defective" and, if not corrected, may appear as confetti-like errors (e.g., before or after performance of a following color interpolation operation). These defective pixels may be corrected (e.g., estimated) by interpolation of accurately recorded data in their neighborhood (e.g., with methods such as median filtering, mean filtering, simple additions, and/or shifts, etc.).

A second color correction operation performed in the sequence by the image processor 104 and/or MMU 206 may be a color interpolation (demosaic) operation, as shown at 444, to interpolate for the pixel a number of missing color values from neighboring pixels. The color interpolation operation 444 may use an output vector from the defect correction operation 442 as input 443 to enable performance of the color interpolation operation 444. The color interpolation operation 444 may, for example, be performed by processing to interpolate the two missing color values for each pixel (e.g., in a Bayer pattern) using one or more of a number of possible correction techniques. Such correction techniques may include: bilinear interpolation; median-value interpolation; bilinear interpolation corrected with gradient; Kodak basic reconstruction; edge sensing interpolation with smooth Hue transition; Kodak edge strength algorithm; variable number gradients; pattern recognition; and/or interpolation with a color correction algorithm; among other possibilities.

A third color correction operation performed in the sequence by the image processor 104 and/or MMU 206 may be a white balance operation, as shown at 446, to shift toward whiteness the color values for the plurality of color components of the pixel. The white balance operation 446 may use an output vector from the color interpolation 444 as input 445 to enable performance of the white balance operation 446. The white balance operation 446 may, for example, be based upon the human vision system having an ability to map a white color to a sensation of being white even though an object may have different radiances when illuminated with different light sources. For example, if a white card is taken outside into sunlight, the card may look white to a person. If the white card is taken inside under fluorescent lights, the card still looks white to the person. If the white card is switched to being illuminated by an incandescent light bulb, the card still looks white to the person. Even if the white card is illuminated by a yellow light bulb, the card still looks white to the person within a few minutes. While being illuminated by each of these light sources, the white card is reflecting a different color spectrum. Nonetheless, the human vision system is capable of making the card look white even while perceiving each of the different color spectra.

In a white balance operation 446 performed by an MMU 206, this may be accomplished by white balance processing. The processing of the white balance operation 446 may be performed by shifting, for example, RGB values using the following Equation (1):

$$\begin{pmatrix} R_w \\ G_w \\ B_w \end{pmatrix} = \begin{pmatrix} W_r & 0 & 0 \\ 0 & W_g & 0 \\ 0 & 0 & W_b \end{pmatrix} \begin{pmatrix} R_d \\ G_d \\ B_d \end{pmatrix} \quad (1)$$

where $W_r$, $W_g$, and $W_b$ are coefficients in a parameter matrix to shift the original values of $R_d$, $G_d$, and $B_d$, respectively, of input 445 of the 3×1 vector 332. $R_w$, $G_w$, and $B_w$, are a 3×1 vector 336 of RGB values output following performance of the white balance operation 446. The values of balancing coefficients $W_r$, $W_g$, and $W_b$ may depend on lighting conditions (e.g., temperature), systems, and/or environments and, thus, may be tunable.

A fourth color correction operation performed in the sequence by the image processor 104 and/or MMU 206 may be a color adjustment operation, as shown at 448, to shift output of the color values from the sensor circuitry to correspond to perception of the image pixel by human vision. The color adjustment operation 448 may use an output vector from the white balance operation 446 as input 447 to enable performance of the color adjustment operation 448. The color adjustment operation 448 may, for example, be performed because the response of a color filter array used on, for example, CMOS sensor circuitry may not match the response of the human vision system closely enough.

The values for color adjustment of RGB may be determined by performance of the following Equation (2):

$$\begin{pmatrix} R \\ G \\ B \end{pmatrix} = \begin{pmatrix} C_{rr} & C_{rg} & C_{rb} \\ C_{gr} & C_{gg} & C_{gb} \\ C_{br} & C_{bg} & C_{bb} \end{pmatrix} \begin{pmatrix} R_{-w} \\ G_{-w} \\ B_{-w} \end{pmatrix} \quad (2)$$

where $$\begin{pmatrix} C_{rr} & C_{rg} & C_{rb} \\ C_{gr} & C_{gg} & C_{gb} \\ C_{br} & C_{bg} & C_{bb} \end{pmatrix}$$

is a color adjustment coefficient parameter matrix that includes coefficients usable to make the RGB color adjustment. The values of the color adjustment coefficients may be determined according to different lighting conditions (e.g., temperature), systems, and/or environments and, thus, may be tunable.

A fifth color correction operation performed in the sequence by the image processor 104 and/or MMU 206 may be a gamma/lightness/contrast adjustment operation, as shown at 450, to shift lightness and/or contrast for a number of pixels in an image by adjustment of an adjustment vector (e.g., a gamma parameter). The gamma/lightness/contrast adjustment operation 450 may use an output vector from the color adjustment operation 448 as input 449 to enable performance of the gamma/lightness/contrast adjustment operation 450. The gamma/lightness/contrast adjustment operation 450 may, for example, be used to control the overall lightness (e.g., brightness) and/or contrast of the image. Images that may not have their lightness and contrast properly adjusted may appear to be bleached out and/or or too dark. Varying a value of the gamma parameter may contribute to adjustment of not only the lightness, but also of color ratios (e.g., of R to G to B) that affect contrast.

Similar to white balance and color adjustment, the gamma/lightness/contrast adjustment may be determined by performance of the following Equation (3):

$$\begin{pmatrix} R'' \\ G'' \\ B'' \end{pmatrix} = \begin{pmatrix} D_{rr} & D_{rg} & D_{rb} \\ D_{gr} & D_{gg} & D_{gb} \\ D_{br} & D_{bg} & D_{bb} \end{pmatrix} \begin{pmatrix} R' \\ G' \\ B' \end{pmatrix} + \begin{pmatrix} D_r \\ D_g \\ D_b \end{pmatrix} \quad (3)$$

where $$\begin{pmatrix} D_{rr} & D_{rg} & D_{rb} \\ D_{gr} & D_{gg} & D_{gb} \\ D_{br} & D_{bg} & D_{bb} \end{pmatrix}$$

is a lightness and contrast coefficient parameter matrix and $$\begin{pmatrix} D_r \\ D_g \\ D_b \end{pmatrix}$$

is a gamma parameter coefficient that together are usable to make the lightness and/or contrast adjustment. The values of the lightness and contrast coefficients and/or the gamma parameter coefficient may be determined according to different lighting conditions (e.g., temperature), systems, and/or environments and, thus, may be tunable.

A sixth color correction operation performed in the sequence by the image processor 104 and/or MMU 206 may be a color conversion operation, as shown at 452, to convert a number of the plurality of color components for the image pixel provided by the sensor circuitry to a corresponding number of a plurality of color components in a different color space that may, for example, be more suitable for further processing. The color conversion operation 452 may use an output vector from the gamma/lightness/contrast adjustment operation 450 as input 451 to enable performance of the color conversion operation 452.

The color conversion operation 452 may, for example, use three colors (e.g., RGB) of each pixel to be converted to a YUV format (e.g., color space) for further application processing (e.g., video compression, among other such applications). This conversion may be accomplished by performance of Equations (4):

$$Y=0.29900R+0.58700G+0.11400B$$

$$Cb=-0.16874R-0.33126G+0.50000B+2^{SP/2}$$

$$Cr=0.50000R-0.41869G-0.08131B+2^{SP/2} \quad (4)$$

where SP corresponds to sample precision. The components of the YUV color space may be converted back to the RGB color space for each pixel by performance of Equations (5):

$$R=Y+1.40200Cr$$

$$G=Y-0.34414(Cb-2^{SP/2})-0.71414(Cr-2^{SP/2})$$

$$B=Y+1.72200(Cb-2^{SP/2}) \quad (5)$$

Using Equations 4-5, RGB values may be converted to YCbCr values of the YUV color space, which may be utilized in further (e.g., digitalized) processing, and YCbCr values may be converted back to RGB values.

A seventh color correction operation performed in the sequence by the image processor 104 and/or MMU 206 may be a down-sampling operation, as shown at 454, to reduce inclusion of color values for pixels of the image, for at least one of the plurality of color components in the different color space, to a lower number of color values. The down-sampling operation 454 may use an output vector from the color conversion operation 452 as input 453 to enable performance of the down-sampling operation 454.

The down-sampling operation 454 may, for example, be performed to correspond to visual perception of the image being processed. One down-sampling ratio that may be used for such down-sampling is "4:2:0", which means that no down-sampling is performed on four pixels of the Y component, such that all four pixels remain, and 2:1 vertical and horizontal down-sampling is performed for the Cb component and the Cr component, such that only one out of four pixels remain. With a down-sampling ratio having been selected, there are a number of techniques to implement processing of the down-sampling operation 454. One technique is to just duplicate the value of one pixel and skip the other adjacent pixels. This may reduce complexity, but potentially produce block effects. Another technique is to apply filtering algorithms. A compromise technique is to apply averaging between adjacent and/or neighboring pixels.

In a number of embodiments, further processing 456 may be performed in the sequence of color correction operations 440 by the image processor 104 and/or MMU 206 and/or may be performed downstream by other components and/or processors (e.g., of a host (not shown)) of the resource implementation 100 illustrated in FIG. 1. The further processing 456 may use, or begin with using, an output vector from the down-sampling operation 454 as input 455 to enable performance of the further processing 456. Performance of the further processing 456 may produce an output 434 (e.g., either further 3×1 vectors 336 and/or a completed image based on the color corrected pixels described herein). Examples of such further processing 456 are described in connection with FIG. 7 and elsewhere herein.

Computational complexity and/or memory access may be increased when digital signal processors (DSPs) and/or application-specific integrated circuits (ASICs) external to (e.g., located in, or associated with, a host and/or host processor) a memory array, in which pixel values are stored, are used to implement processing of the color correction operations. Such external DSPs and/or ASICs may be utilized, for example, in an architecture of a digital camera where the application processor also is used to perform digital processing of applications other than image signal and/or color correction processing. However, a plurality of parameters and/or parameter matrices applied at various positions in performance of a sequence of color correction operations may contribute to reduction in power consumption and/or an increase in data access bandwidth relative to image signal and/or color correction processing performed external to the MMUs 206 and/or the image processor 104. The outcome of performance of such processing may be tuned by adjustment of the values used for these parameters and/or parameter matrices, which may vary with different lighting conditions, environments, and/or sensor systems.

Figure 5:
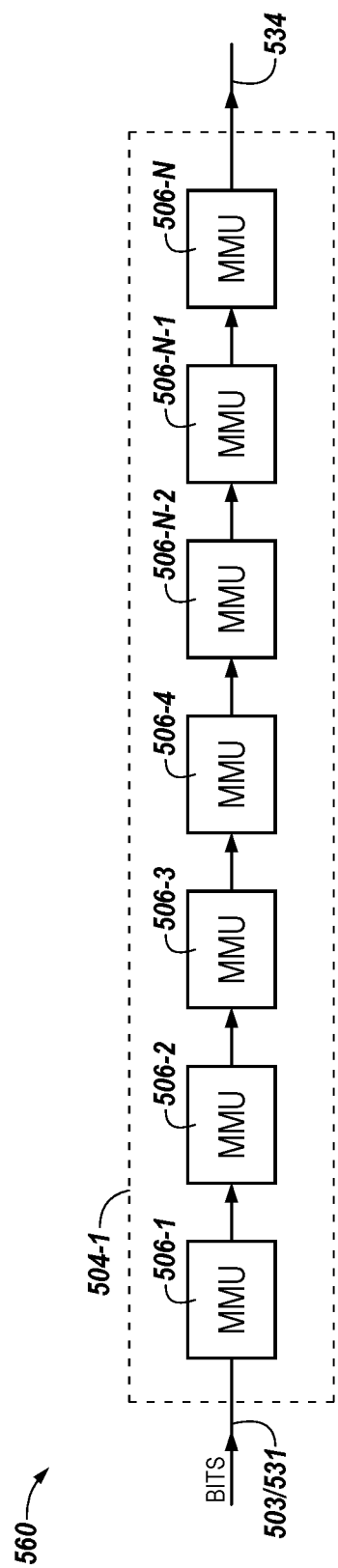
FIG. 5 is a block diagram illustrating an example of a plurality of color correction operations that may be performed by a corresponding plurality of MMUs of an image processor formed in an array of memory cells in accordance with a number of embodiments of the present disclosure.

FIG. 5 is a block diagram illustrating an example of a plurality of color correction operations that may be performed by a corresponding plurality of MMUs 506 of an embodiment of an image processor 504-1 formed in an array of memory cells in accordance with a number of embodiments of the present disclosure. The plurality of MMUs 506 may be formed in a pipeline configuration 560 (e.g., where each MMU, except a last MMU, is coupled to a next MMU). The embodiment of the image processor 504-1 illustrated in FIG. 5 may be formed in an array of memory cells (e.g., the crossbar array 211 described in connection with FIG. 2) as a plurality of serially coupled MMUs (e.g., as shown at 506-1, 506-2, . . . , 506-N). The number of the plurality of serially coupled MMUs 506 may depend upon the number of the corresponding plurality of color correction operations (e.g., as shown at 442, 444, . . . , 454 and described in connection with FIG. 4) performed in a sequence (e.g., as shown at 440 and described in connection with FIG. 4), which may vary depending upon a particular implementation.

The image processor 504-1 may be configured to (e.g., directly) couple to the color filter array (e.g., sensor circuitry 102) to receive the plurality of bits 503 (e.g., of input vector 531). The image processor 504-1 may be further configured to perform one of a sequence of a plurality of color correction operations on each of the corresponding plurality of the serially coupled MMUs. Accordingly, the image processor 504-1 may be configured to perform a matrix multiplication on an input vector 531 and a parameter matrix (e.g., as shown at 333 and described in connection with FIG. 3 and described in connection with Equations 1-3 and FIG. 4) on each of the corresponding plurality of the serially coupled MMUs 506 to determine an output vector 534 that is color corrected.

Each of a number of input vectors may correspond to an output vector determined by performance of a preceding in-memory color correction operation on an MMU. For example, as shown and described in connection with FIG. 4, an output vector for the defect correction operation 442, which may result from performance of the operation by MMU 506-1 in FIG. 5, may correspond to the input vector 443 for performance of the color interpolation operation 444, which may be operated on to perform the color interpolation operation by MMU 506-2 in FIG. 5.

Accordingly, the plurality of the serially coupled MMUs may be formed in the pipeline 560 such that a first MMU (e.g., 506-1) of the pipeline may be configured to perform a first color correction operation of the sequence on a first input vector and a second MMU (e.g., 506-2) of the pipeline 560 may be configured to perform a second color correction operation of the sequence on a first output vector received from the first MMU (e.g., 506-1) as a second input vector for the second MMU (e.g., 506-2). In a number of embodiments, in a same clock cycle with the performance of the second color correction operation on the second MMU (e.g., 506-2), the first MMU (e.g., 506-1) may be configured to perform a repeat of the first color correction operation of the sequence on a third input vector (e.g., on a different plurality of bits 503 of input vector 531).

A last output vector (e.g., 534) provided by a last MMU (e.g., 506-N) of the pipeline 560 as the color corrected output vector is output from the last MMU (e.g., 506-N) of the pipeline to enable a first input vector (e.g., corresponding to the just-mentioned third input vector of the different plurality of bits 503 of input vector 531) to be input to a first MMU (e.g., 506-1) of the pipeline 560 and continuous movement of input and output vectors through the sequence of the plurality of color correction operations. The color corrected output vector 534 may be output from the plurality of the serially coupled MMUs (e.g., 506-1, 506-2, . . . , 506-N) for storage (e.g., by other memory cells of the crossbar array 211) and/or for further processing (e.g., as described in connection with FIGS. 4 and 7).

Matrix multiplication may be performed on each of the number of input vectors and a particular parameter matrix (e.g., as shown at 333 and described in connection with FIG. 3 and described in connection with Equations 1-3 and FIG. 4) and/or a particular mathematical operation may be performed on the input vectors (e.g., as in connection with Equations 4-5 and FIG. 4) by respective MMUs. The particular parameter matrix and/or code for performing the particular mathematical operation may be stored by a particular MMU to enable performance of a particular one of the plurality of color correction operations until a last color corrected output vector is determined for a first image pixel. Moreover, the particular parameter matrix and/or code for performing the particular mathematical operation may be stored by the particular MMU (e.g., each of the pipeline 560 of MMUs 506-1, 506-2, . . . , 506-N) to enable repetitive input of input vectors 531 of different pluralities of bits 503 corresponding to different pixels to be input to the first MMU 506-1 and output 534 from the last MMU 506-N. In a number of embodiments, each of a number of a plurality of output vectors and a corresponding number of a plurality of input vectors utilized in performance of the matrix multiplication may be a 3×1 vector. The determined output vector 534 that is color corrected also may be a 3×1 vector.

Figure 6:
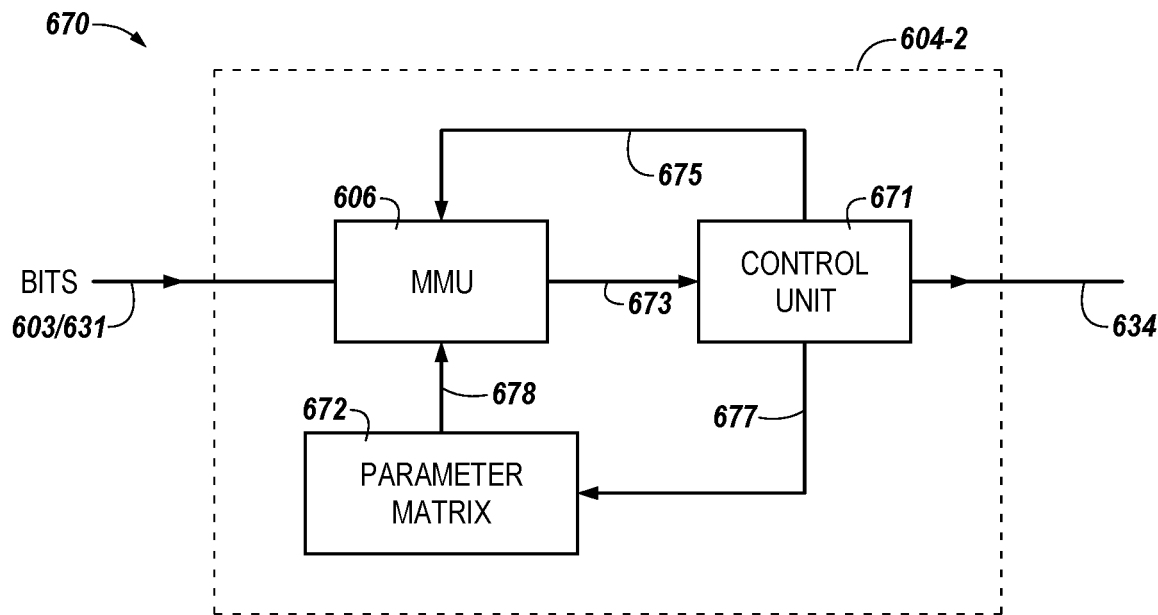
FIG. 6 is a block diagram illustrating an example of a configuration for performance of a plurality of color correction operations on a single MMU of an image processor formed in an array of memory cells in accordance with a number of embodiments of the present disclosure.

FIG. 6 is a block diagram illustrating an example of a configuration for performance of a plurality of color correction operations 670 on a single MMU 606 of an image processor 604-2 formed in an array of memory cells in accordance with a number of embodiments of the present disclosure. The embodiment of the image processor 604-2 illustrated in FIG. 6 may be formed in association with an array of memory cells (e.g., the crossbar array 211 described in connection with FIG. 2) to include the single MMU 606. The image processor 604-2 may be configured to (e.g., directly) couple to the digital image sensors (e.g., sensor circuitry 102) to receive the plurality of bits 603 (e.g., of input vector 631).

The image processor 604-2 may be formed to include a parameter matrix component 672 configured to store a plurality of selectable parameter matrices (e.g., as shown at 333 and described in connection with FIG. 3 and described in connection with Equations 1-3 and FIG. 4). The image processor 604-2 may be further formed to include a control unit 671 configured to select from the plurality of selectable parameter matrices 672 and direct input 678 to the single MMU 606 of a selected parameter matrix.

The image processor 604-2 may, in a number of embodiments, be configured to couple to a plurality of the sensors to receive a data value 603/631 to indicate each level of the plurality of color components and perform a sequence (e.g., as shown at 440 and described in connection with FIG. 4) of a plurality of color correction operations on the single MMU 606. The image processor 604-2 may perform the sequence of operations to include performance of matrix multiplication on an input vector and the selected parameter matrix, inputted by the control unit 671 to the single MMU 606 from the parameter matrix component 672, to determine an output vector 673 that is color corrected. An adjustment vector (e.g., a gamma parameter as described in connection with the fifth color correction operation 450 and FIG. 4) may be input, by the control unit 671, to the single MMU 606 (e.g., as another 3×1 parameter to be utilized in the matrix multiplication on a 3×1 input vector and a selected 3×3 parameter matrix).

The single MMU 606 of the image processor 604-2 may (e.g., as described in connection with FIG. 2) be formed as part of the array of memory cells and may be (e.g., directly) coupled to the plurality of the sensors. The parameter matrix component 672 and/or the control unit 671 of the image processor 604-2 may each be directly coupled to the single MMU 606 (e.g., as shown at 678 for parameter matrix component 672 and at 673 and 675 for control unit 671). The control unit 671 may be directly coupled 677 to the parameter matrix component 672 such that color correction processing is performed on data values stored on memory cells of the image processor 604-2 and data values involved with in-memory color correction processing may, in a number of embodiments, not be moved for processing to a host component (not shown) that is indirectly coupled to the array.

Each of the plurality of selectable parameter matrices that is stored by the parameter matrix component 672, and that is selectable by the control unit 671 for input to the single MMU 606, may include parameter entries configured to enable performance of a particular color correction operation of the sequence. The control unit 671 may be configured to direct the single MMU 606 to output an output vector 673 corresponding to a first pixel, determined by performance of a first color correction operation in the sequence, for storage by the control unit 671. The control unit 671 may be configured to direct input 678 from the parameter matrix component 672 to the single MMU 606 of a second selected parameter matrix corresponding to a second color correction operation. The control unit 671 may be configured to direct input 675 of the stored output vector corresponding to the first pixel as an input vector for performance of the second color correction operation. The sequence of the plurality of color correction operations may be performed as such on the single MMU 606 until an intended (e.g., desired) color corrected output vector is determined for the first pixel. Color correction operations may be performed by image processor 604-2 on other pixels accordingly.

Figure 7:
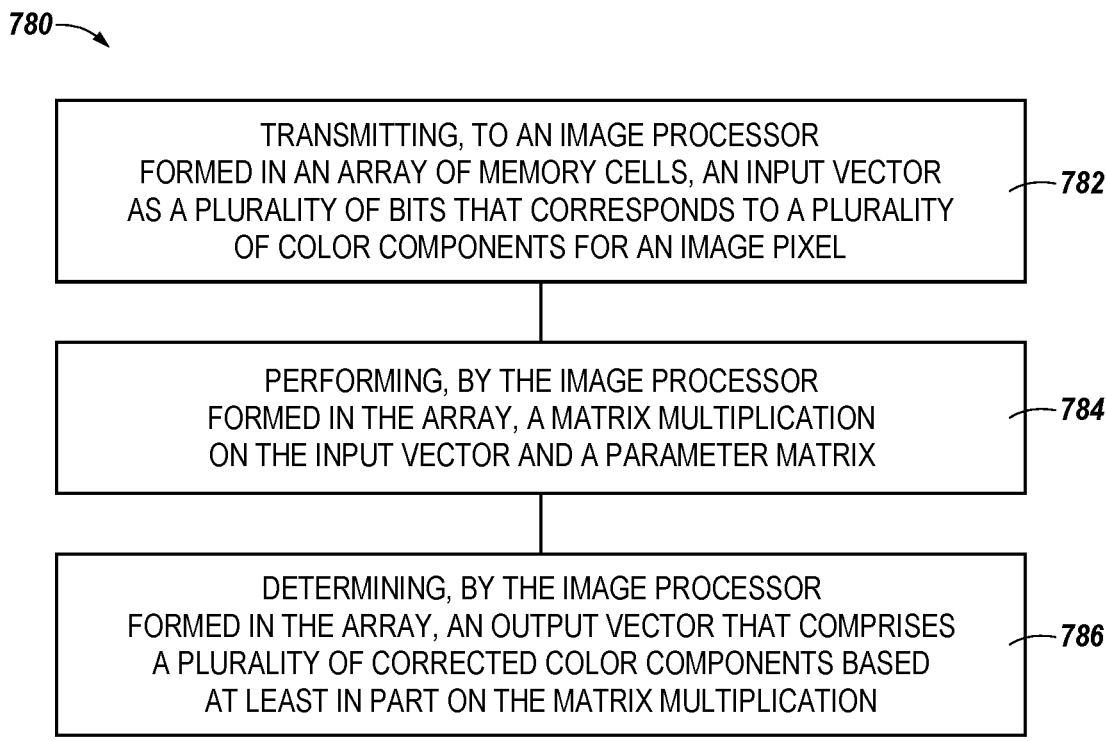
FIG. 7 is a flow chart illustrating an example of an image processor formed in an array of memory cells performing a color correction in accordance with a number of embodiments of the present disclosure.

FIG. 7 is a flow chart illustrating an example of a method 780 for an image processor formed in an array of memory cells performing a color correction in accordance with a number of embodiments of the present disclosure. Unless explicitly stated, elements of methods described herein are not constrained to a particular order or sequence. Additionally, a number of the method embodiments, or elements thereof, described herein may be performed at the same, or at substantially the same, point in time.

At block 782, the method 780 may, in a number of embodiments, include transmitting, to an image processor formed in an array of memory cells, an input vector as a plurality of bits that corresponds to a plurality of color components for an image pixel (e.g., as described in connection with FIG. 1 and elsewhere herein). At block 784, the method 780 may, in a number of embodiments, include performing, by the image processor, a matrix multiplication on the input vector and a parameter matrix. At block 786, the method 780 may, in a number of embodiments, include determining, by the image processor, an output vector that includes a plurality of potentially corrected color components based at least in part on the matrix multiplication (e.g., the color components may potentially be corrected by performance of color correction operations, as described in connection with FIGS. 3 and 4 and elsewhere herein).

In a number of embodiments, the method 780 may further include forming the image processor in the array to include an MMU formed as a 3×3 array of ReRAM cells in a crossbar configuration. The method 780 may further include forming the 3×3 crossbar configuration to correspond to a 3×3 configuration of parameter entries in the parameter matrix (e.g., as described in connection with FIGS. 3 and 4 and elsewhere herein). As described herein, alternative numbers of memory cells may be formed as an MMU in the crossbar configuration (e.g., based at least in part on a variable number of a plurality of bits of an input vector, a variable number of color components, a variable number of bits per pixel, and/or a variable number of parameter entries in the parameter matrix).

The method 780 may further include performing a sequence of a plurality of color correction operations on the image processor (e.g., as described in connection with FIG. 4 and elsewhere herein). In a number of embodiments, the sequence may include performing the color correction operations to (e.g., sequentially) include: a defect correction operation for a pixel having a color value notably different from neighboring pixels; a color interpolation operation to interpolate for the pixel a number of missing color values from neighboring pixels; a white balance operation to shift toward whiteness the color values for the plurality of color components of the pixel; and/or a color adjustment operation to shift output of the color values from the sensor circuitry to correspond to perception of the image pixel by human vision (e.g., as described in connection with FIG. 4).

The method 780 may, in a number of embodiments, further include outputting the color corrected output vector, or a plurality of such output vectors, from the image processor for: storage by memory cells in the array other than memory cells included in the image processor; further processing (e.g., video compression, among other such applications) to form a series of images as a video presentation; further processing to form a single image as a still presentation; further processing in an image recognition operation; and/or further processing by a host processor that is indirectly coupled to the array including the image processor.

The method 780 may include, prior to outputting the color corrected output vector, performing the sequence of the plurality of color correction operations on the image processor to further include, in a number of embodiments, at least one of: a gamma/lightness/contrast adjustment operation to shift lightness and contrast for a number of pixels in an image by adjustment of a gamma parameter; a color conversion operation to convert a number of the plurality of color components for the image pixel provided by the sensor circuitry to a corresponding number of a plurality of color components in a different color space more suitable for further processing; and/or a down-sampling operation to reduce inclusion of color values for pixels of the image, for at least one of the plurality of color components in the different color space, to a lower number of color values (e.g., as described in connection with FIG. 4 and elsewhere herein).

In the above detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, particularly with respect to the drawings, reference numbers with hyphenated digits and/or designators such as "M", "N", "X", "Y", etc., (e.g., 506-1, 506-2, . . . , 506-N in FIG. 5) indicate that a plurality of the particular feature so designated may be included. Moreover, when just the first three digits are utilized (e.g., 506) without the hyphenation, the digits are presented to generally represent, in some embodiments, all of the plurality of the particular feature.

It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically for access to and/or for movement (transmission) of instructions (e.g., control signals, address signals, etc.) and data, as appropriate to the context. The terms "data" and "data values" are used interchangeably herein and may have the same meaning, as appropriate to the context (e.g., one or more data units or "bits").

While example embodiments including various combinations and configurations of memory resources, processing resources, color correction processors (CPUs), matrix multiplication units (MMUs), ReRAM cells, crossbar arrays, parameter matrices, input vectors, output vectors, controllers, control units, and parameter matrix components, among other components, applicable to an color correction processor have been illustrated and described herein, embodiments of the present disclosure are not limited to those combinations explicitly recited herein. Other combinations and configurations of the memory resources, processing resources, CPUs, MMUs, ReRAM cells, crossbar arrays, parameter matrices, input vectors, output vectors, controllers, control units, and parameter matrix components applicable to the color correction processor disclosed herein are expressly included within the scope of this disclosure.

Although specific embodiments have been illustrated and described herein, those of ordinary skill in the art will appreciate that an arrangement calculated to achieve the same results may be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of operating a memory device, comprising:
providing, via sensor circuitry, an input vector as a plurality of bits corresponding to a plurality of color components for an image pixel;
providing the input vector to an image processor comprising a number of matrix multiplication units (MMUs), each matrix multiplication unit comprising a plurality of memory cells of an array, the plurality of memory cells corresponding to respective parameter entries in a parameter matrix;
performing a color correction operation in the array by performing matrix multiplication on the input vector and the parameter matrix to determine a color corrected output vector; and
performing a sequence of a plurality of color correction operations on the image processor, wherein the sequence comprises performing:
a defect correction operation for a pixel having a color value notably different from neighboring pixels;
a color interpolation operation to interpolate for the pixel a number of missing color values from neighboring pixels;
a white balance operation to shift toward whiteness the color values for the plurality of color components of the pixel; and
a color adjustment operation to shift output of the color values from the sensor circuitry to correspond to perception of the image pixel by human vision.

2. The method of claim 1, further comprising:
determining the color corrected output vector by performance of a preceding color correction operation, wherein the color corrected output vector corresponds to the input vector; and
storing the parameter matrix within the MMUs to enable performance of the color correction operation until a last color corrected output vector is determined for the image pixel.

3. The method of claim 1, further comprising outputting the color corrected output vector from the image processor for further processing by a host processor that is indirectly coupled to the array including the image processor.

4. The method of claim 1, further comprising performing the color correction operation in the array by performing matrix multiplication on the input vector and the parameter matrix to determine three color corrected bits.

5. A method of operating a memory device, comprising:
receiving, by an image processor coupled to a color filter array of photosensors, a plurality of bits that correspond to a plurality of color components for an image pixel;

performing one of a sequence of a plurality of color correction operations on each of a corresponding plurality of serially coupled matrix multiplication units (MMUs);

performing a matrix multiplication on an input vector and a parameter matrix on each of the corresponding plurality of the serially coupled MMUs to determine an output vector that is color corrected, wherein a code for performing the parameter matrix is stored in a plurality of memory cells corresponding to a particular matrix to enable performance of the color correction operation until a last color corrected output vector is determined; and sending the input vector to a first MMU of the corresponding plurality of the serially coupled MMUs and through the sequence of the plurality of color correction operations.

6. The method of claim 5, further comprising:

performing a preceding color correction operation on an MMU produces an output vector corresponding to each of a number of input vectors; and performing the matrix multiplication on each of the number of input vectors and a particular parameter matrix stored by an MMU to enable performance of a particular one of the plurality of color correction operations until a last color corrected output vector is determined for the image pixel.

7. The method of claim 5, further comprising performing the sequence of the plurality of color correction operations without feedback from a subsequent color correction operation performed in the sequence.

8. The method of claim 5, further comprising forming an array of memory cells, including the image processor, as resistive random access memory (ReRAM) having memory cells configured to store data values and to perform the color correction operation.

9. The method of claim 5, further comprising:

performing of the matrix multiplication utilizes each of a number of a plurality of output vectors and a number of a plurality of input vectors corresponding to a 3×1 vector; and utilizing a 3×1 vector as the determined output vector that is also color corrected.

10. The method of claim 5, further comprising:

inputting of the input vector from the sensor circuitry to the image processor; and performing of a number of color correction operations in an array by the image processor to determine the color corrected output vector.

11. The method of claim 5, further comprising:

performing determination of the color corrected output vector; and performing the determination of the color corrected output vector without the plurality of memory cells being coupled to sensing circuitry comprising a sense amplifier.

12. A method of operating a memory device, comprising:

providing a first input vector to a first matrix multiplication unit (MMU) of a plurality of serially coupled MMUs, the plurality of serially coupled MMUs formed in a pipelined configuration such that each MMU, except a last MMU, is coupled to a next MMU;

performing a first color correction operation of a sequence of a plurality of color correction operations on the first input vector;

performing a second color correction operation on a first output vector received from the first MMU as a second input vector for a second MMU; and performing a repeat of the first color correction operation of the sequence on a third input vector in a same clock cycle with the performance of the second color correction operation on the second MMU;

directing at least one of the MMUs to output an output vector corresponding to a first pixel, determined by performance of a color correction operation in the sequence, for storage by a control unit;

directing input from a parameter matrix component to the at least one MMU of a second selected parameter matrix corresponding to another color correction operation;

directing input of the stored output vector corresponding to the first pixel as an input vector for performance of the second color correction operation; and performing the sequence of the plurality of color correction operations on the at least one MMU until the color corrected output vector is determined for the first pixel.

13. The method of claim 12, further comprising providing a data value that indicates a level of one of a plurality of color components for an image pixel.

14. The method of claim 13, further comprising:

receiving a data value from a coupled plurality of digital image sensors to indicate each level of the plurality of color components; and performing a sequence of a plurality of color correction operations on a single MMU.

15. The method of claim 12, further comprising:

forming the at least one MMU in an array of the plurality of memory cells as a 3×3 array of resistive random access memory (ReRAM) cells in a crossbar configuration; and storing each plurality of selectable parameter matrices by the parameter matrix component; and selecting nine (3×3) parameter entries to be stored on the 3×3 array input to the at least one MMU.

16. The method of claim 12, further comprising inputting a 3×1 adjustment vector to the at least one MMU as another parameter to be utilized in a matrix multiplication on a 3×1 input vector and a selected 3×3 parameter matrix.

17. The method of claim 16, further comprising:

forming the at least one MMU of the image processor as part of an array of the plurality of memory cells, directly coupled to a plurality of sensors; and processing data values involved with color correction without moving the data values to a host component that is indirectly coupled to the array by a parameter matrix component and a control unit of the image processor coupled directly to the at least one MMU, wherein the control unit is coupled to the parameter matrix component.

18. The method of claim 16, further comprising enabling performance of a particular color correction operation of the sequence through parameter entries from each of a plurality of selectable parameter matrices that is stored by the parameter matrix component and that is selectable by the control unit for input to the at least one MMU.

* * * * *